Sept. 9, 1969   C. E. LYALL   3,465,880
COMPACT WATER SOFTNER AND BRINE STORAGE TANK
Filed May 2, 1966
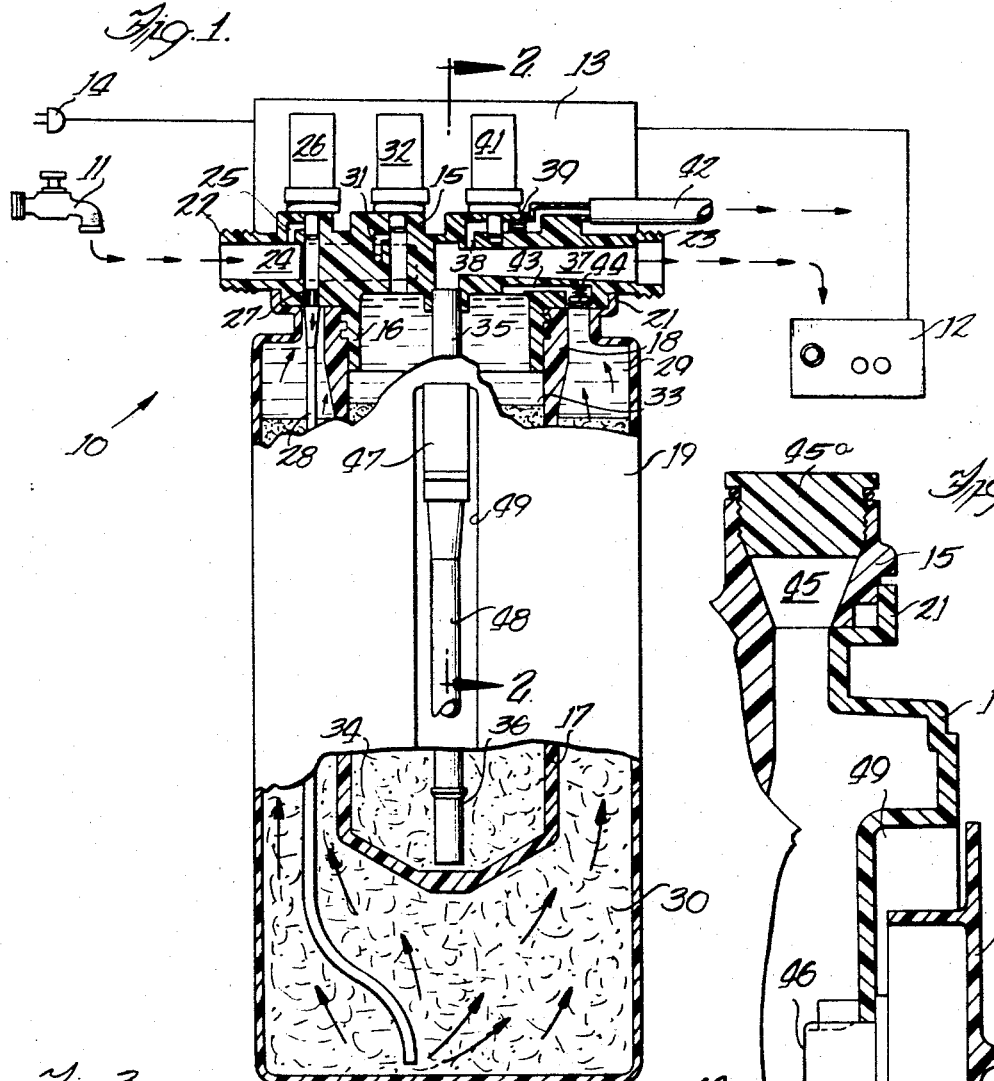
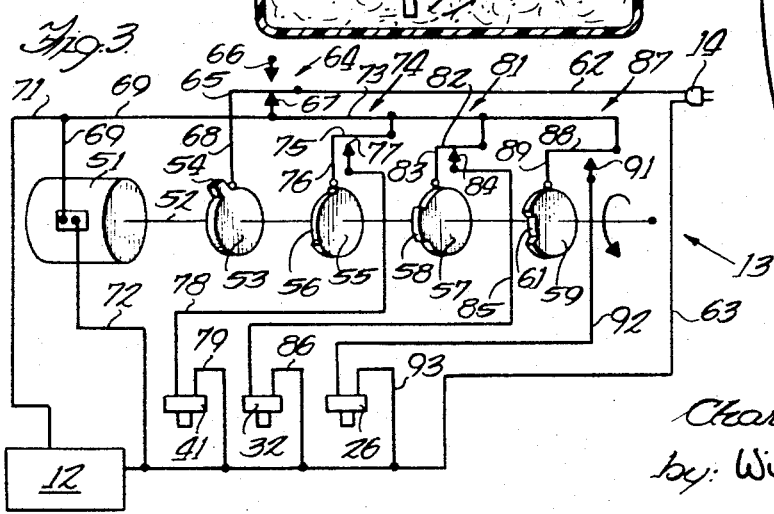
Inventor
Charles E. Lyall
by: Wilson & Geppert
Atty's

United States Patent Office 3,465,880
Patented Sept. 9, 1969

3,465,880
COMPACT WATER SOFTENER AND BRINE STORAGE TANK
Charles E. Lyall, Deerfield, Ill., assignor to Culligan, Inc., Northbrook, Ill., a corporation of Delaware
Filed May 2, 1966, Ser. No. 546,643
Int. Cl. B01d 29/08, 29/36
U.S. Cl. 210—136
6 Claims

ABSTRACT OF THE DISCLOSURE

A compact water softener and brine storage tank having a housing for water softening material generally concentrically positioned within a brine storage tank with both the housing and the container sealingly secured to a unitary cover; which cover also provides the flow passages and connections to the raw water inlet, the treated water outlet, the drain outlet, and the housing and container. The cover includes a raw water inlet with communicating passages to the water softener housing and the brine storage tank, a treated water outlet communicating with the water softener housing and having a branch drain passage, a brine passage leading from the brine storage tank to the housing, and timer actuated solenoid valves controlling flow from the inlet to the brine storage tank and the softener housing and from the housing to the drain passage.

---

The present invention relates to a compact water softener assembly and more particularly to a compact water softener having a brine storage tank surrounding the softener body and a timer for controlling the rejuvenation of the softening material. An appliance may be connected to the softener and the timer to utilize the soft or treated water produced thereby.

Among the objects of the present invention is the provision of a compact water softener designed to produce from approximately ten to forty gallons of soft water starting with an influent water hardness of approximately twenty-five grains. The resin tank is formed of a thermoplastic material containing approximately 1/20 of a cubic foot of ion exchange resin. This resin tank is connected to a source of hard water and the outlet of the tank is adapted to be connected to an appliance in a home such as a clothes washing machine, dishwasher, expresso coffee maker, bathtub, etc., which will receive the treated water from the softener.

Another object of the present invention is the provision of a compact water softener having a resin tank contained within a salt storage container also formed of a plastic material which will supply brine to the resin tank to regenerate the ion exchange resin when it is exhausted. The outer container stores a quantity of salt for the production of brine to regenerate the softening material. A head or cover sealingly closes both the top of the resin tank and the brine and salt storage container. The head includes suitable passages and valves to provide a softening cycle and a regeneration cycle when properly actuated.

A further object of the present invention is the provision of a compact water softener and salt storage container assembly where a conduit from the head or cover for the assembly extends downward into the brine and salt storage container to supply water thereto, and a check valve in said head or cover is positioned in a passage communicating between the brine storage area and the interior of the resin tank. As a flow controller is located in the drain line and a second flow controller of a lower flow rate is located in the above mentioned conduit, the pressure in the brine storage tank is retained at a low level so that the brine storage container may be formed of relatively inexpensive low pressure plastic material.

The present invention also comprehends the provision of a compact softener and brine storage container having a novel salt filling arrangement. Built into the head or cover is a funnel-shaped salt entrance that is normally sealed off with a plastic plug. Spaced below the funnel-shaped entrance in the side wall of the brine storage container is an outlet controlled by a slide drain valve and leading to a drain line. When the tank is to be replenished with salt, the slide drain valve is opened and the plug removed. Pouring salt into the funnel causes displacement of water in the container and this water exits through the drain line.

Further objects are to provide a construction of maximum simplicity, efficiency, economy and ease of assembly and operation, and such further objects, advantages and capabilities as will later more fully appear and are inherently possessed thereby.

In the drawing:
FIGURE 1 is a view partially in cross section and partially in side elevation of a compact water softener and encompassing brine storage tank connected to a source of hard water and to an appliance receiving the treated water.

FIG. 2 is a partial or fragmentary vertical cross sectional view taken on the line 2—2 of FIG. 1 showing the salt filling arrangement for the brine storage tank.

FIG. 3 is a schematic showing of the timer control and wiring circuit for the softener.

Referring more particularly to the disclosure in the drawing wherein is shown an illustrative embodiment of the present invention, FIG. 1 discloses a compact water softener and brine storage container assembly 10 connected to a source of hard water at 11 to supply treated water to an appliance 12, such as an automatic clothes washer, dishwasher, etc. The assembly also includes a timer 13 connected to a source of electric power 14 and controlling actuation of the assembly 10 and the appliance 12.

The compact softener and brine storage assembly 10 includes a head or cover 15 having a generally centrally positioned depending annular flange 16 which is externally threaded to threadingly engage an internally threaded upper end 18 of a generally cylindrical body or housing 17 adapted to receive sufficient water treating and/or softening material to provide sufficient soft water for a complete cycle of the appliance 12. Specifically, this unit contains a charge of approximately 1/20 of a cubic foot of ion exchange resin, which resin will produce approximately 10 to 40 gallons of soft water starting with an influent hardness of approximately 25 grains. However, these designations are not meant to be limiting.

Also, a brine storage tank or container 19 of a size to encompass the housing 17 and provide sufficient space therebetween for approximately 15 pounds of salt is suitably secured to the cover 15 through the flange 21. The head 15 is provided with a hard water inlet 22 connected to the source of hard water at 11 and a soft water outlet 23 connected to supply water to the appliance 12. An inlet passage 24 from the inlet 22 has a branch passage 25 controlled by a brine solenoid valve 26 leading to a flow controller 27 of approximately 1/8 gallon per minute capacity. A conduit 28 extends from the flow controller 27 into the chamber 29 formed between the exterior of the housing 17 and the interior of the brine storage container 19 for the storage of granulated salt 30 and brine.

A second branch passage 31 from the inlet passage 24 is controlled by a second or service solenoid valve 32 and leads to the chamber 33 in the housing containing the ion exchange resin 34. An outlet manifold 35 is positioned to extend downward into the housing 17 and resin 34 to terminate adjacent the bottom of the housing in a strainer 36. The outlet manifold 35 communicates with an outlet passage 37 leading to the soft water outlet 23. A drain passage 38 containing a flow controller 39 of approximately ¼ g.p.m. capacity is controlled by a third or drain solenoid valve 41; the drain passage 38 leading to a drain line 42. The head 15 also contains a brine passage 43 having a spring-biased check valve 44 therein, the passage 43 extending between the brine chamber 29 and the chamber 33 in the housing 17.

As seen in FIG. 2, a funnel-shaped salt entrance 45 is provided in the head 15 and is normally closed by a plastic plug 45a and sealing O-ring. Also formed in the wall of the container 19 is a drain outlet 46 normally closed by a slide valve 47 leading to a drain line 48. A recess 49 is provided in the side wall of the container 19 to receive the valve and drain line.

Now considering the timer control assembly 13, FIG. 3 discloses a schematic showing of this timer connected to a source of power 14 and to the appliance 12. The timer 13 includes a motor 51 rotating a shaft 52 having cams 53, 55, 57 and 59 thereon. Cam 53 has a projection 54 thereon, cam 55 includes a recess 56 of a length for the regeneration operation, cam 57 includes a projection 58 of less length than the recess 56, and cam 59 includes a recess 61 of the same length as projection 58 to cover only the time interval for brining.

A pair of conductors or lines 62, 63 lead from the power source 14, line 62 leading to a single-pole double-throw switch 64 and line 63 leading to the appliance 12. The switch 64 includes a switch arm 65, an inactive contact 66 and a contact 67. The arm 65 is actuated by a follower 68 riding on the cam 53. The contact 67 has a line 69 leading to the timer motor 51 and line 71 leading to the appliance 12 in parallel with the motor 51; a line 72 leading from the motor to line 63. The contact 67 also has a line 73 leading to the three switches 74, 81 and 87 actuated by cams 55, 57 and 59, respectively. The switch 74 has an arm 75 connected to line 73 and actuated by a follower 76 to engage a contact 77. A line 78 extends from contact 77 to the rinse solenoid valve 41; line 79 extending from the valve to line 63.

The switch 81 is connected to the line 73 and has an arm 82 actuated by a follower 83 for the third cam 57. A contact 84 adapted to be engaged by the switch arm 82 has a line 85 leading to the service solenoid valve 32; a line 86 connecting the valve 32 to line 63. The third switch 87 connected to line 73 has a switch arm 88 actuated by a follower 89. Contact 91 of this switch has a line 92 leading to the brine solenoid valve 26; a line 93 extending from the valve to line 63. This timer 13 is to provide a complete operating cycle for the softener assembly 10 and for the appliance 12.

To initiate operation, the appliance 12 is filled with dishes or clothes, soap added and its cycle timer is turned to the "on" position. As the timer 13 has not been actuated, the appliance does not have any power for operation. Then the timer 13 is actuated by turning the shaft 52 to the position shown in FIG. 3 with the follower 68 dropped off of projection 54 on cam 53 and follower 76 lifted off of recess 56. The followers 83 and 89 were previously moved to their present operative positions. The switch arm 65 engages contact 67 to initiate operation of the motor 51 through line 62, arm 65, contact 67, line 69, motor 51 and lines 72 and 63. Also the appliance 12 is actuated through line 71 connected to line 69 and the service solenoid valve 32 is actuated as the arm 82 engages contact 84. The service solenoid valve 32 is actuated through line 62, arm 65, contact 67, line 73, arm 82, contact 84, line 85, solenoid valve 32 and lines 86 and 63.

Water then flows from the hard water source 11 into the inlet 22, inlet passage 24 and branch passage 31 and into the softener housing 17. The water flows down through the ion exchange resin 34 and the softened water enters the outlet manifold 35 through the strainer 36 and flows upward to and through the outlet passage 37 and soft water outlet 23 to the appliance 12. Soft water is supplied throughout the cycle of the appliance until it has completed its cycle and shut off stopping the flow of water. Once the appliance has completed its cycle, the cams 55 and 59 reach the drop-off points for recesses 56 and 61, respectively, and cam 57 reaches the projection 58.

When the cam followers 76 and 89 enter the cam recesses 56 and 61, respectively, and the follower 83 is raised by projection 58, the switches 74 and 87 are actuated to initiate the regeneration operation for the softener assembly 10, while switch 81 is opened. Switch arm 75 engages contact 77 to provide a circuit to the rinse solenoid valve 41 through line 62, switch arm 65, contact 67, line 73, switch arm 75, contact 77, line 78, solenoid valve 41, and lines 79 and 63. Also a circuit is completed to switch 87 which has arm 88 engaging contact 91 to complete the circuit to the brine solenoid valve 26. The circuit to the brine solenoid valve 26 is completed through line 62, arm 65, contact 67, line 73, arm 88, contact 91, line 92, solenoid valve 26, and lines 93 and 63.

With solenoid valves 26 and 41 actuated, water entering inlet 22 passes through passage 24 and branch passage 25, through the flow control 27, to the brine conduit extending to the bottom of the brine storage container 19 and dissolves the salt 30 to form brine. The brine moves upward past the check valve 44 and into the passage 43 to enter the housing 17 and pass downward through the exhausted resin. The waste effluent passes up the outlet manifold 35 to outlet passage 37 and thence to drain passage 38, through the flow controller 39, and out the drain line 42. The brine storage container 19 is not under line pressure due to the flow control 27 of approximately ⅛ g.p.m. in passage 25, and the only appreciable restriction is the approximately ¼ g.p.m. flow control 39 in the drain passage 38.

When the brining operation is completed, the follower 89 moves out of recess 61 to close valve 26, and follower 83 drops off of projection 58 to reactivate service solenoid valve 32 for the rinse cycle through the circuit previously described. This shuts off flow to the brine storage container 19 and rinse water flows through the inlet passage 24, branch passage 31 and down through the resin 34, with the waste effluent passing up through the manifold 35 and out the drain passage 38. Rinsing continues until the projection 54 on the cam 53 lifts the follower 68 to disengage switch arm 65 from contact 67 and terminate current flow to the switches 74, 81 and 87, the motor 51 and the appliance 12. All the solenoid valves are shut and the resin is regenerated and ready for another cycle of the appliance.

When the salt level in the brine storage container 19 is low, the container 19 must be refilled and it is desirable that no spillage of liquid occur in the home. Therefore, the plastic plug 45a and O-ring are removed from the funnel-shaped salt entrance 45 and the slide valve 47 controlling the outlet 46 is opened. By pouring salt into the funnel-shaped entrance 45 it will subsequently fall into the container 19, displacing liquid through the drain valve 47 and drain hose 48. This latter drain hose 48 can be run into a bucket or sink. At the completion of filling, the drain valve 47 is shut off and the plug 45a inserted into the entrance 45.

The appliance 12 can be an automatic clothes washer, dishwasher, expresso coffee maker or other suitable appliance requiring both a source of soft water and a source of power, and the nature of the appliance is not meant to be limiting on the scope of the invention. Obviously, the compact softener can also be used to provide soft or treated water where no appliance is involved, and the circuit for the appliance would then be omitted.

I claim:
1. A compact water softener assembly comprising a generally cylindrical housing having an upper open end and containing water treating material, a generally cylin- drical container encompassing said housing and storing soluble regenerating material, a unitary head sealingly engaging both the housing and the container, said head having a hard water inlet passage and a soft water outlet passage, a drain passage communicating with said outlet passage, a solenoid valve in said drain passage, a regenerant passage communicating between said inlet passage and a regenerant conduit, said regenerant conduit extending from the regenerant passage to adjacent the bottom of the container, a regenerant solenoid valve in said regenerant passage, a service inlet passage communicating between said inlet passage and said housing, a service solenoid valve in said service inlet passage, a brine passage communicating between said container and said housing, said brine passage being so located that its opening into said housing is at a point above the water treating material in said housing, a check valve in said brine passage, said check valve allowing one way flow from said container to said housing, an outlet manifold extending into said housing to adjacent the bottom thereof and communicating with said outlet passage, said unitary head containing all of the inlet, outlet, drain, regenerant, service inlet, and brine passages and all of the valves associated with said passages, said head further being formed with means to introduce regenerating material into the container, and said container having means to allow liquid overflow when said regenerating material is being introduced.

2. A compact water softener assembly as set forth in claim 1, in which a flow controller is positioned in said drain passage and a second flow controller of a lesser flow rate is located in said regenerant passage.

3. A compact water softener assembly as set forth in claim 1, in which said means to introduce regenerating material into the container includes a funnel-shaped entrance in the head leading to the space between the container and the housing, said container overflow means including a drain outlet in the side wall thereof, and a slide valve controlling the drain outlet.

4. A compact water softener assembly as set forth in claim 1, including a timer control system for actuating said solenoid valves in proper sequence to provide service, regeneration and rinsing of the softening material.

5. A compact water softener assembly as set forth in claim 4, in which an appliance is connected to the soft water outlet and the timer control system to receive the soft water and be energized by the timer control system.

6. A compact water softener as set forth in claim 4, in which liquid flow initially is through the service solenoid valve into the housing to treat the liquid for use, and when said flow from the outlet is terminated, the brine and drain solenoid valves are actuated and said service solenoid valve is deenergized to divert flow down into the container, up through the check valve and regenerant passage and down through the exhausted material and out through the drain passage, and subsequently the regenerant solenoid valve is deenergized and the service solenoid valve is reenergized to rinse the ion exchange material, and then all of the solenoid valves are deenergized.

References Cited

UNITED STATES PATENTS

| | | | |
|---|---|---|---|
| 2,007,068 | 7/1935 | Beck | 210—281 |
| 2,906,332 | 9/1959 | Rosten et al. | 210—190 X |
| 2,999,514 | 9/1961 | Kryzer | 210—191 X |
| 3,092,738 | 6/1963 | Lamkin | 210—190 X |
| 3,278,424 | 10/1966 | Griswold | 210—191 X |
| 3,307,914 | 3/1967 | Heiss et al. | 23—272 X |
| 3,347,785 | 10/1967 | Staats | 210—190 X |
| 3,352,419 | 11/1967 | Entringer et al. | 210—190 X |
| 3,374,891 | 3/1968 | Buchmann | 210—191 X |
| 3,385,441 | 5/1968 | Lyall | 210—134 |
| 3,169,110 | 2/1965 | Rudelick | 210—191 |

FOREIGN PATENTS 849,080    11/1939    France.

REUBEN FRIEDMAN, Primary Examiner

W. S. BRADBURY, Assistant Examiner

U.S. Cl. X.R.

23—272; 210—140, 190, 281, 288